United States Patent [19]

Johansson

[11] Patent Number: 4,675,770

[45] Date of Patent: Jun. 23, 1987

[54] MULTIPLE VOLTAGE REGULATOR INTEGRATED CIRCUIT HAVING CONTROL CIRCUITS FOR SELECTIVELY DISABLING A VOLTAGE REGULATOR IN AN OVER-CURRENT CONDITION

[75] Inventor: Jan H. Johansson, Bålsta, Sweden

[73] Assignee: Telefonaktiebolaget L. M. Ericsson, Stockholm, Sweden

[21] Appl. No.: 696,306

[22] Filed: Jan. 30, 1985

[51] Int. Cl.[4] ............ H02H 5/04

[52] U.S. Cl. ............ 361/18; 361/103

[58] Field of Search ............ 36/18, 103; 323/269, 323/272, 276, 907; 179/184, 81 R, 77; 307/200 A, 297, 310

[56] References Cited

U.S. PATENT DOCUMENTS

| | | | |
|---|---|---|---|
| 1,224,400 | 5/1917 | MacGahan | 361/103 |
| 3,225,257 | 12/1965 | Fegley | 361/18 |
| 3,400,325 | 9/1968 | Webb | 361/18 X |
| 3,622,849 | 11/1971 | Kelley, Jr. et al. | 361/103 X |
| 3,643,130 | 2/1972 | Liska et al. | 361/103 |
| 3,729,671 | 4/1973 | Jeffery et al. | 361/18 X |
| 4,001,649 | 1/1977 | Young | 361/103 X |
| 4,020,397 | 4/1977 | Fasulkey et al. | 361/103 X |
| 4,021,701 | 5/1977 | Davies | 361/103 X |
| 4,053,996 | 10/1977 | Schertz et al. | 361/103 X |
| 4,142,115 | 2/1979 | Nakata et al. | 307/310 X |
| 4,315,296 | 2/1982 | Hancock | 361/103 |
| 4,371,909 | 2/1983 | Kano | 361/103 X |
| 4,428,016 | 1/1984 | Brasfield | 361/103 X |
| 4,488,200 | 12/1984 | Matsuzaki | 361/18 X |

OTHER PUBLICATIONS

*Lambda Power Hybrid Voltage Regulators*, 1971, Catalog Supplement.

*Primary Examiner*—A. D. Pellinen
*Assistant Examiner*—A. Jonathan Wysocki
*Attorney, Agent, or Firm*—Knobbe, Martens, Olson & Bear

[57] ABSTRACT

A quadruple voltage regulator has four independently controllable power circuits in a single integrated circuit, and includes a current sensor for each of the power circuits. Each current sensor generates an active output signal when the magnitude of the current produced by the corresponding voltage regulator exceeds a selected limit. A single temperature sensing device monitors the temperature of the integrated circuit and generates a control signal when the temperature exceeds a selected threshold temperature magnitude. The output of the each current sensor is independently combined with the control signal from the temperature sensor to disable the corresponding voltage regulator circuit when the temperature exceeds the threshold magnitude coincident with an excess current produced by the regulator.

3 Claims, 1 Drawing Figure

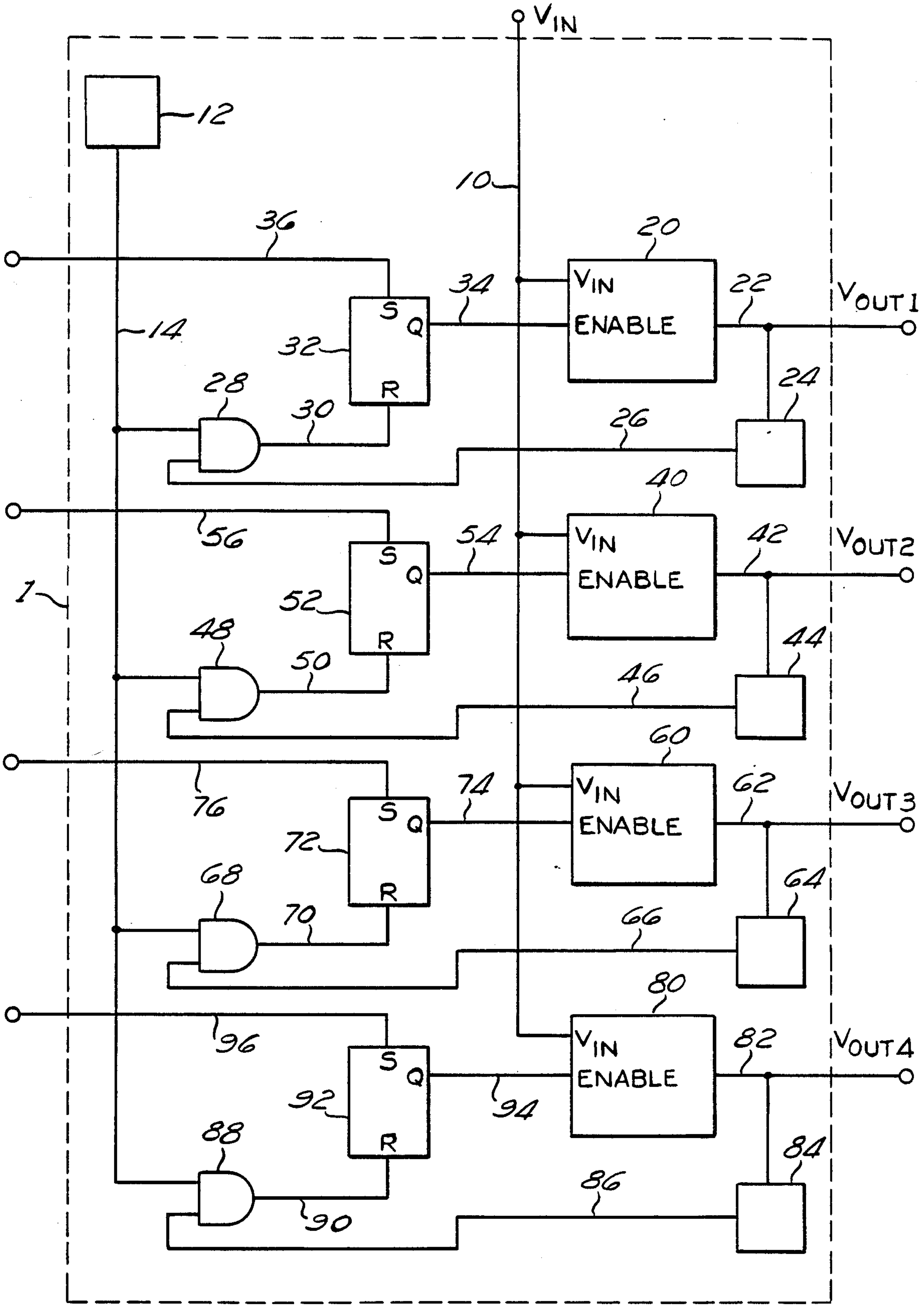
VIN
12
10
14
36
20
VIN
ENABLE
22
VOUT1
34
S
Q
32
R
28
30
24
26
56
40
VIN
ENABLE
42
VOUT2
54
1
52
48
50
44
46
76
60
VIN
ENABLE
62
VOUT3
74
72
68
70
64
66
96
80
VIN
ENABLE
82
VOUT4
92
94
88
84
86
90

MULTIPLE VOLTAGE REGULATOR INTEGRATED CIRCUIT HAVING CONTROL CIRCUITS FOR SELECTIVELY DISABLING A VOLTAGE REGULATOR IN AN OVER-CURRENT CONDITION

BACKGROUND OF THE INVENTION

This invention generally relates to multiple voltage regulators in a single integrated circuit package. In particular, it relates to voltage regulators used for providing regulated voltage to telephone subscriber circuits.

The power for the operation of a telephone is provided over the same telephone lines which provide the signaling and the voice or data communications. Typically, this power is provided at the local switching center, and may be provided by a storage battery or other source of direct current voltage. Since a number of subscriber lines derive their power from a common source, variations in the loading on the source caused by fluctuations in the use of the telephone service by the subscribers can result in unacceptable variations in the voltage provided to the subscribers. Thus, it is customary practice to provide voltage regulators to control the voltage provided to each subscriber.

Although the voltage regulator for each subscriber can be provided as a separate device, the cost of doing so would be prohibitive when compared with the cost of using multiple regulators in a single integrated circuit device. However, when multiple devices are included in one circuit, problems with one regulator in the integrated circuit can cause all of the regulators in the circuit to become inoperable. For example, a short circuit on the output of one regulator can cause the temperature of the integrated circuit to increase to an unacceptable temperature and cause the failure of the entire circuit. Thus, a problem with one subscriber line can cause the failure of all subscriber lines associated with the integrated circuit package. For this reason, prior art devices have turned off all the regulators in the circuit if an over-temperature condition occurs. Although this protects the other circuits from damage, it also unnecessarily interrupts the power to the subscribers served by the other regulators.

Therefore, a need exists for providing a plurality of voltage regulators in one integrated circuit device with a means for sensing temperature, and an ability to independently disable the one voltage regulator which is causing the over-temperature condition, thus, allowing the remaining voltage regulators to continue to operate.

SUMMARY OF THE INVENTION

The present invention comprises an integrated circuit device having a plurality of independently controllable voltage regulators. Each regulator includes a current sensor which senses when the current provided by the voltage regulator exceeds an acceptable magnitude and provides an output signal indicative of an over-current condition. The integrated circuit further comprises a temperature sensor which provides an output signal when the temperature of the integrated circuit device exceeds an acceptable magnitude. The signal from the temperature sensor is provided as a common control signal to control circuits associated with each of the voltage regulators. In the control circuit associated with each regulator, the common temperature control signal is combined with the over-current indication signal from the corresponding current sensor connected to the regulator. If the over-current signal from a current sensor associated with a regulator is active coincident with the active over-temperature signal, the control circuit associated with the voltage regulator will operate to disable the regulator. Thus, only a regulator having an over-current condition will be disabled. The remaining regulators in the integrated circuit will continue to operate.

The present invention has the advantage that only the voltage regulator for a subscriber circuit exhibiting an excessive current is disabled. Furthermore, a voltage regulator is not disabled unless the excessive current is of sufficient duration and magnitude to cause the temperature of the integrated circuit to increase to an unacceptable magnitude. The other subscriber circuits obtaining their power from a common integrated circuit are not affected by a subscriber circuit having an over-current condition.

BRIEF DESCRIPTION OF THE DRAWING

The FIGURE illustrates a preferred embodiment of the present invention having four voltage regulators in a single integrated circuit.

DETAILED DESCRIPTION OF THE INVENTION

The FIGURE illustrates an integrated circuit 1 comprising four voltage regulators 20, 40, 60, 80 and a temperature sensor 12. Each of the voltage regulators 20, 40, 60, 80 has a control circuit associated with it which selectively enables or disables the associated voltage regulator by applying a control signal to an ENABLE input to the voltage regulator. A common input line 10 provides an unregulated DC voltage $V_{IN}$ to the voltage input to each regulator. When operating, each regulator 20, 40, 60, 80 provides a substantially constant output voltage to a subscriber telephone circuit (not shown) electrically connected to it via output lines 22, 42, 62, 82, respectively. In the preferred embodiment, each of the voltage regulators, 20, 40, 60, 80 operates in substantially the same manner. Thus, the following description of the control circuit associated with the voltage regulator 20 is applicable to the voltage regulators 40, 60, 80. It should be understood that corresponding elements of each of the voltage regulators are designated with numerals differing in value by 20.

The voltage regulator 20 operates in a conventional manner well-known to the art to provide a regulated output voltage $V_{OUT1}$ on the line 22 which remains substantially constant irrespective of fluctuations on the voltage $V_{IN}$ on the line 10, within a prescribed range. The magnitude of the voltage $V_{OUT1}$ on the line 22 can be determined by external components connected in a conventional manner to the voltage regulator 20, or, the voltage $V_{OUT1}$ may be fixed, as determined by the particular construction of the voltage regulator 20.

A current sensing circuit 24 is connected to the line 22. The current sensing circuit 24 constantly monitors the magnitude of the current provided by the regulator 20 and provides an active output signal on a line 26 when the current exceeds a selected threshold magnitude. In one exemplary embodiment of this invention, the current sensor 24 is set to activate the output signal on line 26 when the current on the line 22 exceeds 110% of its normal value. In another exemplary embodiment, the current sensor 24 can be set to activate the output signal on the line 26 when the current on the line 22 exceeds 90% of the maximum allowable current for the regulator 20. The design and operation of the current sensor 24 are well-known to the art. In an exemplary embodiment of the present invention, the voltage regulator 20 includes a current limiting circuit (not shown) which causes the output voltage $V_{OUT1}$ to decrease when the current exceeds a selected threshold magnitude. The current sensing circuit 24 is implemented with a voltage comparator, electrically connected to the line 22, which generates an output signal on the line 26 when the voltage $V_{OUT1}$ decreases below a selected threshold magnitude as a result of the current limiting. Further information regarding current limiting techniques and their effect on the output voltage of a regulator can be found in Henry Wurzburg, *VOLTAGE REGULATOR HANDBOOK,* Motorola, Inc., 1976, pp. 46–52.

The over-current signal on the line 26 is provided as an input to an AND-gate 28. The other input to an AND-gate 28. The other input to the AND-gate 28 is connected to a line 14 which is connected to the output of the temperature sensor 12. The output of the AND-gate 28 on line 30 is connected to the reset input R of a memory element 32. As shown, the memory element 32 is a set-reset flip-flop having an output Q on a line 34 which is connected to the ENABLE input of the voltage regulator 20.

The temperature sensor 12 is preferably incorporated into the same integrated circuit as the voltage regulators 20, 40, 60, 80, and their associated control circuits. The construction of temperature sensors using temperature-dependent resistors of other temperature dependent circuit elements are well known to the art. In the preferred embodiment, the temperature sensor 12 provides an output signal on the line 14 which is active when the temperature of the integrated circuit 1 exceeds a selected threshold magnitude. It will be understood that under normal operating conditions, the temperature of the integrated circuit 1 will be determined by the magnitude of the currents provided by the voltage regulators 20, 40, 60, 80 on the lines 22, 42, 62, 82, respectively. Thus, an excess current condition on one of the output lines 22, 42, 62, 82 caused by, for example, a short circuit on a subscriber telephone line, will cause the temperature sensed by the temperature sensor 12 to increase.

If the temperature sensed by the temperature sensor 12 exceeds the selected threshold temperature magnitude, causing the signal on the line 14 to be activated, and coincidently the current provided by the voltage regulator 20 exceeds the set current threshold magnitude of the current sensor 24, causing the signal on the line 26 to be activated, both inputs to the AND-gate 28 will be active. Therefore, the line 30 on the output of the AND-gate 28 will be active causing the flip-flop 32 to be reset. The signal on the line 34 which is normally active, will change to its inactive condition. Since the line 34 is connected to the ENABLE input to the voltage regulator 20, when the line 34 changes to its inactive condition, the voltage regulator 20 will be disabled. Thus, the voltage regulator 20 will no longer provide the voltage $V_{OUT1}$ on the line 22. Therefore, the over-current condition on the line 22 sensed by the current sensor 24, will cease.

It should be understood that a transient over-current condition on the output of the voltage regulator 20 will not cause the voltage regulator 20 to be disabled. The voltage regulator 20 will only be disabled if the over-current condition is of sufficient duration and magnitude to cause the temperature of the integrated circuit 1 to increase above the selected threshold temperature magnitude.

If the over-current condition on the line 22 was the sole cause of the over-temperature condition sensed by the temperature sensor 12, disabling of the voltage regulator 20 will cause the temperature of the integrated circuit 1 to decrease and the signal on the line 14 will return to its inactive condition. Although the output of the AND-gate 28 on the line 30 will no longer be active, the flip-flop 32 remains reset until an active signal is imposed on the line 36 connected to the set input S of the flip-flop 32. Thus, when the voltage regulator 20, has been disabled by the combination of over-temperature and over-current, it will not be re-enabled until activation of the signal on the line 36. In a fully automatic switching system, the line 36 will be connected to a control unit, such as a computer (not shown), which will only re-enable the voltage regulator when the source of the condition causing the over-current is found and corrected. In less automated systems, the line 36 can be connected to a switch for manual activation.

The other voltage regulators 40, 60, 80 and their associated control circuitry in the integrated circuit 1 operate in the same manner as described above in connection with the voltage regulator 20 and its associated control circuitry. Although the control circuits for each of the voltage regulators are commonly connected to the line 14 connected to the temperature sensor 12, only a voltage regulator exhibiting an over-current condition and having an active signal on the output of its current sensor will be disabled by an over-temperature condition. The other voltage regulators will continue to operate so long as the magnitudes of their currents remain below the selected threshold magnitudes. Thus, since the over-temperature condition is most likely to be caused by over-current in one voltage regulator, disabling the voltage regulator exhibiting the over-current condition will also correct the over-temperature condition.

A novel apparatus and a method have been disclosed which allow a plurality of voltage control devices to be incorporated into a single integrated circuit. The invention is particularly advantageous in that a failure condition on one or more of the voltage control devices in the integrated circuit requiring that device to be disabled does not cause the remaining devices in the circuit to be disabled. Thus, a failure in one telephone subscriber line connected to a common integrated power source does not cause the other lines connected to that same power source to be disabled.

What is claimed is:

1. In an integrated circuit having a first voltage regulator providing a first output current to a first load and having a second voltage regulator providing a second output current to a second load, a method of selectively disabling a single one of said first and second voltage regulators having an over-current condition, comprising the steps of:

monitoring the magnitudes of said first and second output currents;

comparing the magnitude of said first output current to a first threshold current magnitude and generating a first over-current signal only when the magnitude of said first output current exceeds said first threshold current magnitude;

comparing the magnitude of said second output current to a second threshold current magnitude and generating a second over-current signal only when the magnitude of said second output current exceeds said second threshold current magnitude;

monitoring the magnitude of the temperature of the integrated circuit;

comparing the magnitude of said temperature to a selected threshold temperature magnitude and generating a single over-temperature signal when said magnitude of said temperature exceeds said selected threshold temperature magnitude; and disabling only a single one of said first and second voltage regulators when its respective over-current signal is present at the same time as said single over-temperature signal.

2. An integrated circuit which provides a plurality of regulated output voltages to a plurality of loads, said integrated circuit comprising:

a first voltage regulator which provides a first output voltage;

a second voltage regulator which provides a second output voltage;

a temperature sensor which generates a single active over-temperature signal when the magnitude of the temperature of said integrated circuit exceeds a threshold temperature magnitude;

a first control circuit comprising:

a first current sensor which monitors a first output current provided by said first voltage regulator, and which compares the magnitude of said first output current to a first threshold current magnitude, and which provides a first over-current signal that has an active state when said first output current exceeds said first threshold current magnitude; and a first memory circuit which selectively enables and disables said first voltage regulator, said first memory circuit operable in response to the coincidence of said single active over-temperature signal and said active state of said first over-current signal and disables only said first voltage regulator without disabling said second voltage regulator; and a second control circuit comprising:

a second current sensor which monitors a second output current provided by said second voltage regulator, and which compares the magnitude of said second output current to a second threshold current magnitude, and which provides a second over-current signal that has an active state when said second output current exceeds said second threshold current magnitude; and a second memory circuit which selectively enables and disables said second voltage regulator, said second memory circuit operable in response to the coincidence of said single active over-temperature signal and said active state of said second over-current signal and disables only said second voltage regulator without disabling said first voltage regulator.

3. The integrated circuit, as defined in claim 2, wherein said first memory element comprises:

a logic gate having two inputs and an output, one of said inputs electrically connected to receive said over-temperature signal of said temperature sensor, the other of said inputs electrically connected to receive said first over-current signal of said first current sensor, said output of said logic gate providing an active signal when said single over-temperature signal and said first over-current signal are both active at the same time; and a flip-flop having an input and an output, said flip-flop input electrically connected to the output of said logic gate, said flip-flop output electrically connected to said first voltage regulator to provide a control signal to enable said first voltage regulator when said control signal is active and to disable said first voltage regulator when said control signal is inactive, said flip-flop responsive to said output of said logic gate such that the occurrence of said active signal on said output of said logic gate causes said control signal of said flip-flop to become inactive, thereby disabling said first voltage regulator when said single over-temperature signal and said first over-current signal are both active at the same time.

* * * * *